United States Patent
Saito

(10) Patent No.: US 11,288,512 B2
(45) Date of Patent: Mar. 29, 2022

(54) ELECTRONIC APPARATUS, CONTROL DEVICE, AND CONTROL METHOD

(71) Applicant: SHARP KABUSHIKI KAISHA, Sakai (JP)

(72) Inventor: Takanori Saito, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 85 days.

(21) Appl. No.: 16/841,012

(22) Filed: Apr. 6, 2020

(65) Prior Publication Data

US 2020/0334464 A1 Oct. 22, 2020

(30) Foreign Application Priority Data

Apr. 22, 2019 (JP) .............................. JP2019-081267

(51) Int. Cl.
*G06K 9/00* (2006.01)
*G06K 9/20* (2006.01)
*G06K 9/46* (2006.01)

(52) U.S. Cl.
CPC ............ *G06K 9/00711* (2013.01); *G06K 9/20* (2013.01); *G06K 9/4652* (2013.01)

(58) Field of Classification Search
CPC .... G06K 9/00711; G06K 9/20; G06K 9/4652; G06K 9/00744; G06K 9/00664; H04N 5/23229; H04N 5/23222; H04N 5/262
USPC ....................................................... 382/162
See application file for complete search history.

(56) References Cited

U.S. PATENT DOCUMENTS

| | | | |
|---|---|---|---|
| 9,721,613 B2 * | 8/2017 | Yamaji | H04N 1/00466 |
| 11,093,754 B2 * | 8/2021 | Johnston | G06K 9/628 |
| 2007/0120986 A1 | 5/2007 | Nunomaki | |
| 2007/0177809 A1 * | 8/2007 | Takahashi | H04N 5/23229 382/232 |
| 2013/0329078 A1 | 12/2013 | Nunomaki | |
| 2014/0154261 A1 * | 6/2014 | Okano | C07K 16/28 424/139.1 |
| 2015/0221343 A1 * | 8/2015 | Yamaji | H04N 1/387 386/241 |
| 2019/0116311 A1 * | 4/2019 | Sato | H04N 5/23216 |
| 2019/0258866 A1 * | 8/2019 | Khadloya | G08B 13/19695 |

FOREIGN PATENT DOCUMENTS

| | | |
|---|---|---|
| CN | 104821001 A | 8/2015 |
| JP | 2007-134770 A | 5/2007 |

* cited by examiner

*Primary Examiner* — Ali Bayat
(74) *Attorney, Agent, or Firm* — ScienBiziP, P.C.

(57) ABSTRACT

An electronic apparatus includes an imaging device and a control device, and the control device performs moving image acquisition processing of acquiring a first moving image captured by the imaging device, important scene determination processing of determining whether or not each of frames included in the first moving image is an important scene, based on image information included in the first moving image, and scene information generation processing of generating important scene information including a result of the determination whether or not each of the frames is the important scene.

8 Claims, 3 Drawing Sheets

ELECTRONIC APPARATUS, CONTROL DEVICE, AND CONTROL METHOD

BACKGROUND

1. Field

The present disclosure relates to an electronic apparatus, a control device, and a control method.

2. Description of the Related Art

In recent years, many smartphones and the like have been provided with a moving image capturing function and there have been more opportunities to capture a moving image by a user. For efficiently viewing and organizing many moving images that are captured, there has been an increasing demand for processing of extracting an important scene in a moving image for editing or reproduction.

For example, Japanese Unexamined Patent Application Publication No. 2007-134770 proposes an imaging device that performs processing of selecting picture portions corresponding to important scenes from captured picture data, on the basis of information that is input during processing of capturing a picture, such as a zoom operation while capturing a picture.

However, the imaging device described in Japanese Unexamined Patent Application Publication No. 2007-134770 is able to select important scenes on the basis of information that is input while capturing a picture, but is difficult to select important scenes in accordance with, for example, a state of a subject in a moving image that is captured. Thus, there is a problem that important scenes are selected regardless of a state of a subject, in which a user is considered to be very interested.

In order to deal with the aforementioned problem, an aspect of the disclosure achieves an electronic apparatus or the like that determines an important scene on the basis of image information in a moving image that is captured.

SUMMARY

In order to deal with the aforementioned problem, an electronic apparatus according to an aspect of the disclosure is an electronic apparatus including at least one imaging device and at least one control device, in which the control device performs moving image acquisition processing of acquiring a first moving image captured by the imaging device, important scene determination processing of determining whether or not each of frames included in the first moving image is an important scene, based on image information included in the first moving image, and scene information generation processing of generating important scene information including a result of the determination whether or not each of the frames is the important scene.

In order to deal with the aforementioned problem, a control device according to an aspect of the disclosure is a control device that controls an electronic apparatus including at least one imaging device, and includes: a moving image acquisition unit capable of performing processing of acquiring a first moving image captured by the imaging device; an important scene determination unit capable of performing processing of determining whether or not each of frames included in the first moving image is an important scene, based on image information included in the first moving image; and a scene information generation unit capable of performing processing of generating important scene information including a result of the determination whether or not each of the frames in the first moving image is the important scene.

In order to deal with the aforementioned problem, a control method according to an aspect of the disclosure is a control method of controlling an electronic apparatus including at least one imaging device, and includes: acquiring a first moving image captured by the imaging device; determining whether or not each of frames included in the first moving image is an important scene, based on image information included in the first moving image; and generating important scene information including a result of the determination whether or not each of the frames in the first moving image is the important scene.

An aspect of the disclosure advantageously provides an electronic apparatus or the like that determines an important scene on the basis of image information in a moving image that is captured.

DESCRIPTION OF THE EMBODIMENTS

[Configuration of Smartphone]

Figure 1:
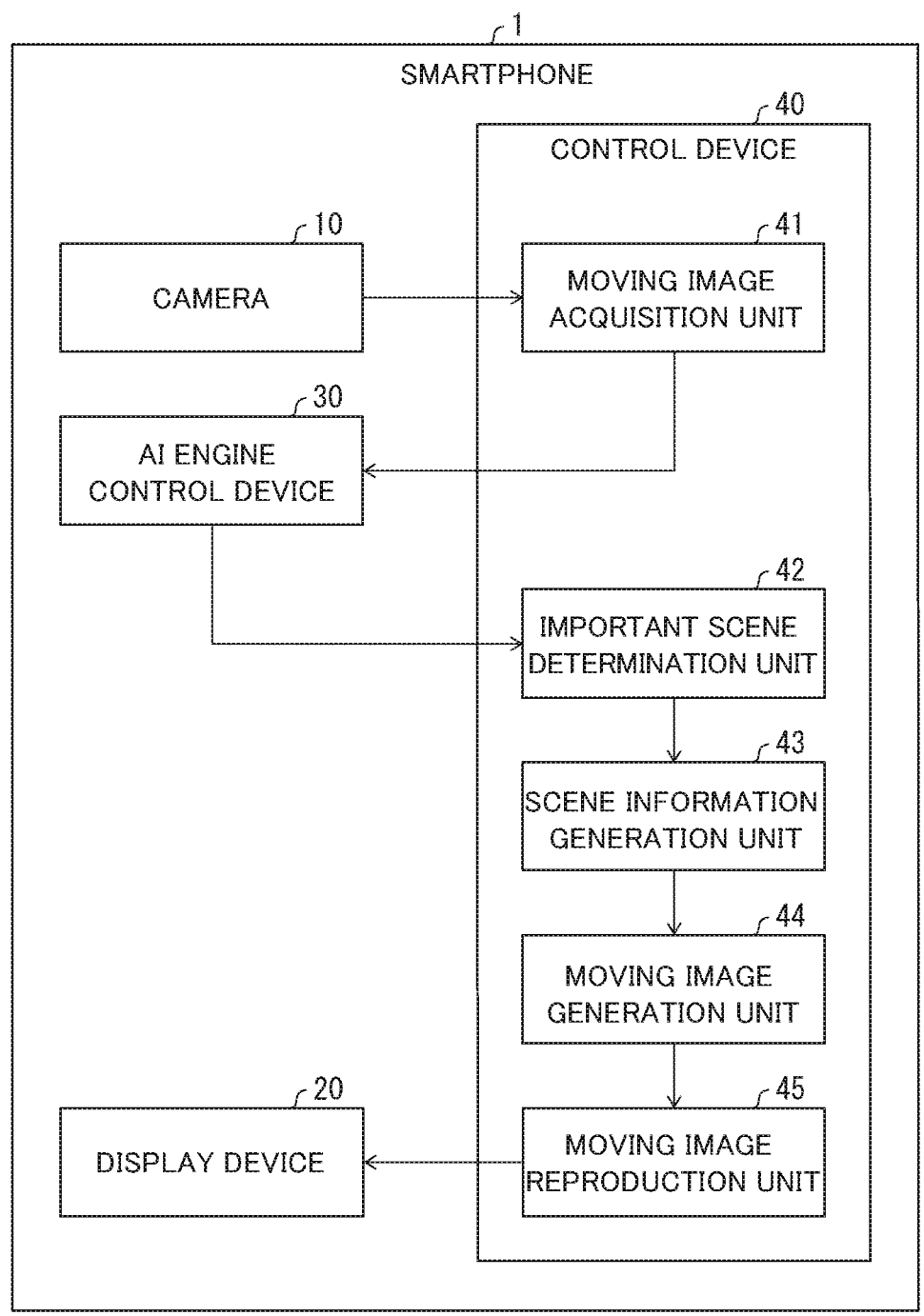
FIG. 1 is a block diagram illustrating a functional configuration of a smartphone according to an embodiment of the disclosure.

An embodiment of the disclosure will be described below with reference to FIGS. 1 to 3. As illustrated in FIG. 1, a smartphone (electronic apparatus) 1 includes at least one camera (imaging device) 10, at least one display device 20, at least one AI engine control device 30, and at least one control device 40. Note that, each of the AI engine control device 30 and the control device 40 is an example of a control device described in the scope of Claims.

<Camera>

The camera 10 is a camera that includes a CCD (Charge Coupled Device), a CMOS (Complementary Metal Oxide Semiconductor), or the like as a light receiving element and is capable of capturing at least a moving image. Note that, the camera 10 may be a camera capable of capturing not only a moving image but also a still image. The smartphone 1 may include another camera used to capture a still image, in addition to the camera 10 used to capture a moving image, or the camera 10 may capture a moving image and a still image at the same time.

<Display Device>

The display device 20 is provided on one surface of the smartphone 1 and displays various types of information including a still image, a moving image, and the like that are stored in the smartphone 1. The display device 20 may be, for example, a liquid crystal display, an organic EL (Electro Luminescence) display, or the like.

<AI Engine Control Device>

The AI engine control device 30 functions as an AI (Artificial Intelligence) engine that operates artificial intelligence. A function as the AI engine is implemented by a CPU (Central Processing Unit), a GPU (Graphics Processing Unit), or a DSP (Digital Signal Processor) provided in the AI engine control device 30. The AI engine control device 30 may include a storage unit (not illustrated) in which data or the like learned by the artificial intelligence is stored.

The AI engine control device 30 calculates a score (evaluates importance) of each of frames included in a moving image or each of scenes each composed of a plurality of continuous frames included in the moving image on the basis of image information in the frame or scene. Here, the image information is information about each frame or scene and may be, for example, at least one of a subject, a composition, a color tone, and the like.

In a case where the score is calculated for, for example, the subject included in the moving image, the score is calculated in accordance with a reference, which is learned by the artificial intelligence in advance, on the basis of a type of the subject (whether the subject is a specific object such as a person or an animal), a size of the subject, motion of the subject, a position of the subject, an orientation of the subject, the number of subjects, brightness of the subject, or the like.

For example, in a case where the subject is a person, the AI engine control device 30 may calculate a score to be higher than that in a case where the subject is not a person. Moreover, in a case where a facial expression of the person is smile, the AI engine control device 30 may calculate a score to be much higher. Note that, a user may set a type of a subject for which a score is calculated to be high. According to such a configuration, the user is able to appropriately set different references for score calculation between a case of capturing a moving image whose capturing target is a person and a case of capturing a moving image whose capturing target is an animal or the like other than a person.

Similarly, in a case where the AI engine control device 30 calculates the score on the basis of the composition included in the moving image, the score is calculated in accordance with a reference learned by the artificial intelligence in advance. For example, as the composition is closer to a composition, such as a composition based on the rule of thirds, which is generally regarded as a good composition, the AI engine control device 30 may calculate a score to be high.

The information about the score calculated by the AI engine control device 30 for each of the frames or scenes is output to an important scene determination unit 42 described later.

<Control Device>

The control device 40 includes, for example, a CPU and integrally controls operations of the smartphone 1. The control device 40 includes a moving image acquisition unit 41, the important scene determination unit 42, and a scene information generation unit 43. Moreover, the control device 40 may further include a moving image generation unit 44 and a moving image reproduction unit 45.

(Moving Image Acquisition Unit)

The moving image acquisition unit 41 performs moving image acquisition processing of acquiring a moving image (first moving image) that is a moving image captured by the camera 10. The moving image acquisition unit 41 outputs the captured moving image that is acquired to the AI engine control device 30.

(Important Scene Determination Unit)

In accordance with the score calculated by the AI engine control device 30 for each of the frames or scenes included in the captured moving image, the important scene determination unit 42 determines whether or not the frame or the scene is an important scene. In other words, the important scene determination unit 42 performs important scene determination processing of determining whether or not each of the frames included in the captured moving image is the important scene on the basis of image information included in the captured moving image. Moreover, the important scene determination unit 42 determines whether or not each of the frames or scenes is the important scene on the basis of at least one of a subject, a composition, a color tone that are related to an image included in the captured moving image.

The important scene determination unit 42 determines whether the frame or the scene is the important scene based on whether or not the score is a predetermined threshold value or greater. The predetermined threshold value is appropriately set by the important scene determination unit 42 in accordance with a reference for score calculation by the AI engine. Alternatively, the predetermined threshold value may be set by the user to any value. Thereby, the user is able to adjust the number of frames or scenes determined to be important scenes by changing the predetermined threshold value.

In a case where a length of a cut-out moving image (second moving image) described later is defined in advance, the important scene determination unit 42 may appropriately adjust the predetermined threshold value so that a length of the moving image, which corresponds to a sum of lengths of all important scenes, is substantially the same as the defined length of the cut-out moving image. Thereby, the important scene determination unit 42 is able to extract an important scene from the captured moving image so that the cut-out moving image is a moving image having a predetermined length.

Note that, the function of the AI engine provided in the AI engine control device 30 may be included in the important scene determination unit 42. In such a case, the AI engine is operated by the CPU or the like provided in the control device 40 and the important scene determination unit 42 performs both processing of calculating the score of each of the frames or scenes included in the captured moving image and processing of determination about whether or not the frame or the scene is an important scene.

As described above, the important scene determination unit 42 can determine which portion of a captured moving image is an important scene on the basis of an image included in the captured moving image.

(Scene Information Generation Unit)

On the basis of a determination result by the important scene determination unit 42, the scene information generation unit 43 performs scene information generation processing of generating important scene information including a result of the determination whether or not each of frames or scenes included in the captured moving image is an important scene. As the important scene information, information indicating whether or not the frame or the scene is an important scene may be directly tagged to each of the frames in the captured moving image.

Moreover, the scene information generation unit 43 may generate information, by which the frame determined as the important scene is specified, as the important scene information separately from data of the captured moving image. According to such a configuration, the smartphone 1 is able to manage the captured moving image and the important scene information separately.

The information by which the frame is specified may be information about a time point at which the frame determined as the important scene in the captured moving image exists in the captured moving image or information indicating what number frame the frame is in the captured moving image. Note that, according to a configuration in which the time point at which the frame exists in the captured moving image is used as the information by which the frame is specified, even when a frame rate of the captured moving image is changed later, a position where the frame determined as the important scene exists in the captured moving image does not change. Thus, it is not necessary to change the important scene information about the captured moving image.

(Moving Image Generation Unit)

The moving image generation unit 44 generates a cut-out moving image (second moving image) by cutting out the important scene from the captured moving image. In other words, on the basis of the important scene information generated by the scene information generation unit 43, the moving image generation unit 44 extracts, as a frame for connection, the frame determined as the important scene from the captured moving image. Then, the moving image generation unit 44 performs moving image generation processing of generating the second moving image formed of a single frame for connection or a plurality of frames for connection that are connected.

According to such a configuration, the moving image generation unit 44 is able to generate the cut-out moving image which is shorter than the captured moving image and which includes only the important scene. Thus, the user is able to obtain the cut-out moving image whose length is short and whose data size is small and is thus able to easily manage the moving image saved in the smartphone 1.

Note that, after generating the cut-out moving image, the control device 40 may store both the captured moving image and the cut-out moving image in a storage device (not illustrated) provided in the smartphone 1. Thereby, even when the cut-out moving image does not include a scene that is considered to be important for the user, the user is able to generate a cut-out moving image from the captured moving image again, for example, by changing the predetermined threshold value. Moreover, after generating the cut-out moving image, the control device 40 may store only the cut-out moving image in the storage device and delete the captured moving image. Thereby, a capacity of the storage device is able to be saved by a capacity of the captured moving image, so that the user is able to store additional moving images in the smartphone 1.

Moreover, the moving image generation unit 44 may further extract, from the frame determined as the important scene by the important scene determination unit 42, the frame, which satisfies a predetermined condition, as the frame for connection. Here, the predetermined condition may be a condition applied to, for example, only a case when there are a fixed number or more of frames continuously determined as important scenes, and examples thereof include an expression of a subject, a composition, and magnitude of motion that are related to such frames.

Specifically, the moving image generation unit 44 may extract much more frames as frames for connection from the series of frames determined as the important scenes when the expression of the subject is smile, as compared to a case where an expression of the subject is not smile. According to such a configuration, in accordance with the predetermined condition, the moving image generation unit 44 is able to change the number of the series of continuous frames determined as the important scenes. Thus, the moving image generation unit 44 is able to adjust a length of a scene that includes the same subject, composition, or the like, and is thus able to generate a cut-out moving image which includes various scenes in a short time and have a content desirable for the user.

The predetermined condition is not limited to the examples described above and may be any condition. As the predetermined condition, various conditions may be set in advance to the smartphone 1 and any predetermined condition may be set by the user. Moreover, through a communication function provided in the smartphone 1, an option of the predetermined condition may be successively increased or updated.

In this manner, according to a configuration in which the frame that satisfies the predetermined condition is further extracted as the frame for connection from the frame determined as the important scene, the control device 40 is able to set a predetermined condition under which a cut-out moving image is generated, in addition to the predetermined threshold value of the score used in determination of an important scene. Thus, since the user is able to finely set and change the condition under which a cut-out moving image is generated, the control device 40 is able to generate a cut-out moving image that suits preference of the user more.

Note that, the control device 40 may cause each of the moving image acquisition unit 41, the important scene determination unit 42, and the scene information generation unit 43 to perform corresponding processing after capturing of a moving image by the camera 10 is completed, or the corresponding processing and the image capturing may be performed substantially in parallel in real time. Such real-time processing is achieved by the control device 40 using the AI engine for at least a part of determination of the important scene.

According to a configuration in which the control device 40 causes such processing to be performed in real time while the moving image is captured, the control device 40 is able to generate the important scene information immediately after capturing of the moving image by the camera 10 is completed. Thus, it is possible to effectively reduce a time lag after capturing of the moving image by the camera 10 is completed until the cut-out moving image is generated by the moving image generation unit 44.

(Moving Image Reproduction Unit)

The moving image reproduction unit 45 performs processing of displaying and reproducing the cut-out moving image on the display device 20. The moving image reproduction unit 45 may apply a transition effect such as fade-out to the cut-out moving image that is reproduced. Moreover, the moving image reproduction unit 45 may reproduce only a specific frame for connection in the cut-out moving image for a fixed time.

In addition, the moving image reproduction unit 45 may reproduce the cut-out moving image in a form in which respective frames for connection in the cut-out moving image are sequentially changed so as to be slid from a side or in a form in which frames for connection are changed so that a size of the reproduced frame for connection is gradually reduced and a size of a next frame for connection is gradually increased.

Further, in a case where there is a still image captured while the moving image is captured, the moving image reproduction unit 45 may reproduce the cut-out moving image with the still image inserted into a predetermined position in the cut-out moving image. The predetermined position may be a position where a frame for connection, which corresponds to the still image, appears in the cut-out moving image, may be at the beginning or end of the cut-out moving image, or may be any other position.

The moving image reproduction unit 45 may reproduce the cut-out moving image in any other forms. Moreover, the aforementioned transition effect or the like may be applied to the cut-out moving image when the moving image generation unit 44 generates the cut-out moving image.

In addition, the moving image reproduction unit 45 may display and reproduce not the cut-out moving image but the captured moving image on the display device 20. In this case, the moving image reproduction unit 45 may reproduce the captured moving image in a form in which the frame or scene determined as the important scene is able to be recognized by the user. The form in which the frame or the scene is able to be recognized by the user is, for example, a form in which a small red circle is displayed on the display device 20 at the frame or scene determined as the important scene.

According to such a configuration, the user is able to check the position of the important scene by viewing the captured moving image. Thereby, the user is able to consider setting for generating a more desirable cut-out moving image, for example, by changing the predetermined threshold value or the predetermined condition.

[Processing Performed by Control Device]

Processing performed by the control device 40, that is, a method of controlling the smartphone 1 by the control device 40 will be described below with reference to FIGS. 2 and 3. Note that, FIG. 2 illustrates an example of processing in which the control device 40 determines whether or not the frame or the scene is an important scene on the basis of a composition in a captured moving image, and FIG. 3 illustrates an example of processing in which the control device 40 determines whether or not the frame or the scene is an important scene on the basis of a subject in a captured moving image.

<Composition Recognition Processing>

Figure 2:
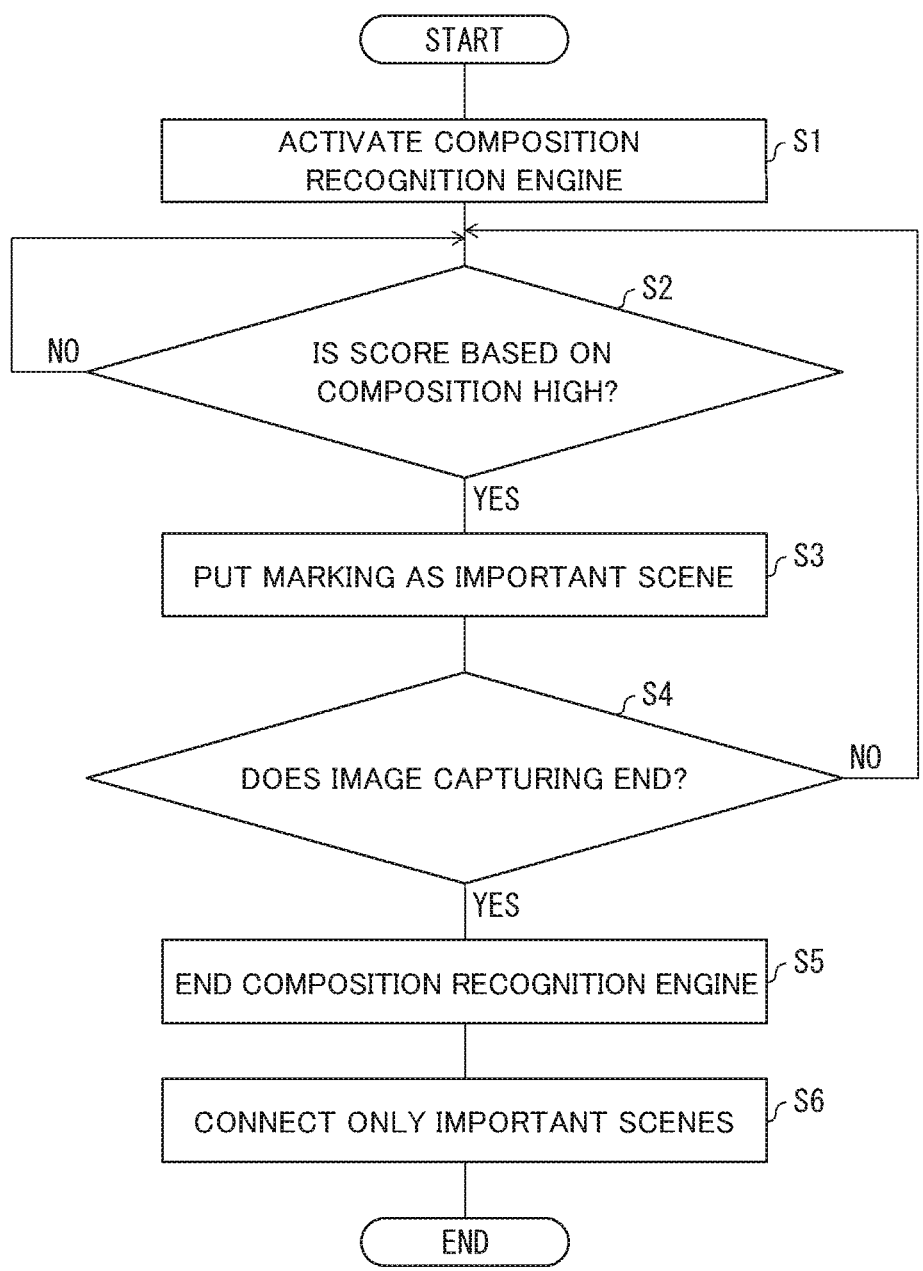
FIG. 2 is a flowchart illustrating composition recognition processing by a control device according to the embodiment of the disclosure.

As illustrated in FIG. 2, the moving image acquisition unit 41 acquires a moving image captured by the camera 10 (moving image acquisition step), and outputs the captured moving image to the AI engine control device 30. Upon input of the captured moving image, the AI engine control device 30 activates a composition recognition engine that is one of AI engines (S1).

Next, the AI engine control device 30 calculates a score of each of frames included in the captured moving image on the basis of a composition of an image and determines whether or not the calculated score is a predetermined threshold value or greater (whether the score is high) (S2, important scene determination step). When the score of one frame based on the composition is not equal to or greater than the predetermined threshold value (NO at S2), the AI engine control device 30 performs the determination of S2 for a next frame.

When the score of one frame based on the composition is equal to or greater than the predetermined threshold value (YES at S2), the important scene determination unit 42 determines that the frame is an important scene. Then, the scene information generation unit 43 puts marking on the frame as the important scene by generating important scene information (S3, scene information generation step).

Next, the important scene determination unit 42 determines whether or not capturing of the moving image by the camera 10 ends (S4). When the image capturing does not end (NO at S4), the AI engine control device 30 and the control device 40 repeatedly perform the processing of S2 and S3 until the image capturing ends. When the image capturing ends (YES at S4), the AI engine control device 30 ends a function of the composition recognition engine (S5).

Next, the moving image generation unit 44 extracts, as a frame for connection, the frame on which the marking is put as the important scene from the captured moving image and generates a cut-out moving image by connecting frames for connection (S6, moving image generation step).

<Subject Recognition Processing>

Figure 3:
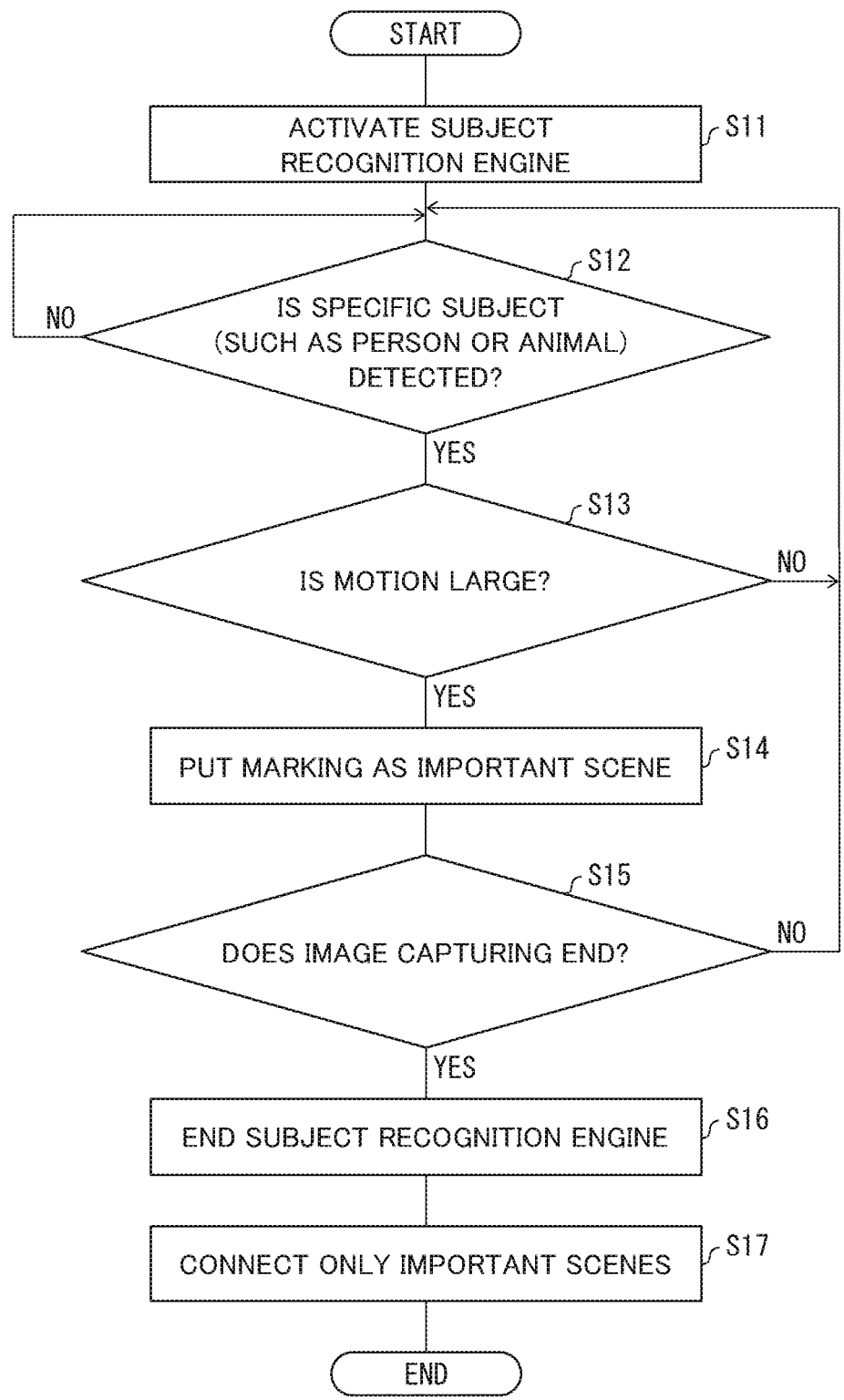
FIG. 3 is a flowchart illustrating subject recognition processing by the control device according to the embodiment of the disclosure.

Moreover, as illustrated in FIG. 3, the moving image acquisition unit 41 acquires a moving image captured by the camera 10 (moving image acquisition step) and outputs the captured moving image to the AI engine control device 30. Upon input of the captured moving image, the AI engine control device 30 activates a subject recognition engine that is one of AI engines (S11).

Next, the AI engine control device 30 determines whether or not image information of each of the frames included in the captured moving image includes a specific subject such as a person or an animal (S12). When one frame does not include a specific subject (NO at S12), the AI engine control device 30 performs the determination of S12 for a next frame.

When one frame includes a specific subject (YES at S12), the AI engine control device 30 further determines whether or not motion of the specific subject is large on the basis of image information of a frame around the frame (S13). When the motion of the specific subject is not large (NO at S13), the AI engine control device 30 performs the determination of S12 for a next frame.

When the motion of the specific subject is large (YES at S13), the AI engine control device 30 calculates a score of the frame to be equal to or greater than a predetermined threshold value and the important scene determination unit 42 determines that that frame is an important scene (important scene determination step). Then, the scene information generation unit 43 puts marking on the frame as the important scene by generating important scene information (S14, scene information generation step).

Next, the important scene determination unit 42 determines whether or not capturing of the moving image by the camera 10 ends (S15). When the image capturing does not end (NO at S15), the AI engine control device 30 and the control device 40 repeatedly perform the processing of S12 to S14 until the image capturing ends. When the image capturing ends (YES at S15), the AI engine control device 30 ends the function of the subject recognition engine (S16).

Next, the moving image generation unit 44 extracts, as a frame for connection, the frame on which the marking is put as the important scene from the captured moving image and generates a cut-out moving image by connecting frames for connection (S17, moving image generation step).

Note that, here, an example in which the subject recognition engine calculates the score on the basis of a type of the subject (whether or not the subject is a specific subject) and magnitude of motion of the subject, which are included in the image information about the frame that is a determination target, is indicated. However, without limitation thereto, the subject recognition engine may calculate the score on the basis of any feature of the subject.

The composition recognition processing by the composition recognition engine and the subject recognition processing by the subject recognition engine that are described above may be performed in parallel in the processing of determining whether or not each of frames included in a captured moving image is an important scene. That is, the AI engine control device 30 may determine whether or not each of frames is the important scene on the basis of at least two or more of a subject, a composition, and a color tone that are related to an image included in the captured moving image.

Moreover, the AI engine provided in the AI engine control device 30 is not limited to the composition recognition engine and the subject recognition engine that are described above and may be any AI engine capable of analyzing a captured moving image.

Modified Example

Each of the aforementioned functions and processing by the smartphone 1 according to the embodiment of the disclosure has been described by assuming a case where a moving image is captured by the user with use of the camera 10. However, in a case where the user captures a still image by the camera 10, in parallel thereto, the camera 10 may capture a moving image in a background and the AI engine control device 30 and the control device 40 may perform processing of, for example, determination about whether the frame or the scene is an important scene by using the moving image as a captured moving image. In other words, the captured moving image may be captured in a case of a still image capturing state. Here, the still image capturing state is a state including at least any of a state in which the camera 10 is able to receive trigger (shutter or the like) to capture a still image or a state in which a still image is being captured. Note that, not the camera 10 but the imaging device provided in the smartphone 1 may capture the still image in this case.

For example, the control device 40 may cause the camera 10 to capture a moving image in a background at all times during a period where the user activates a camera application used for capturing a still image, the important scene determination unit 42 may determine presence or absence of an important scene by using the moving image as a captured moving image, and the moving image generation unit 44 may extract, as a frame for connection, a frame determined as an important scene in the captured moving image and generate a cut-out moving image.

According to such a configuration, when the user captures a still image, a moving image including a time point around the still image is automatically captured by the smartphone 1. Thus, when the user looks back the still image later, the user is able to view a corresponding cut-out moving image. Moreover, in a case where the smartphone 1 is set so as to store not a moving image captured in a background but to store only a cut-out moving image, even when a moving image is captured each time the camera application is activated, only a cut-out moving image including an important scene is stored in the smartphone 1. Accordingly, a storage capacity of the smartphone 1 is not used unnecessarily.

[Implementation Example by Software]

Control blocks (particularly, the moving image acquisition unit 41, the important scene determination unit 42, and the scene information generation unit 43) of the control device 40 may be implemented by a logic circuit (hardware) formed in an integrated circuit (IC chip) or the like or may be implemented by software.

In the latter case, the control device 40 includes a computer that executes a command of a program that is software implementing each function. The computer includes, for example, at least one processor (control device) and at least one computer-readable recording medium that stores the program. When the processor reads the program from the recording medium and executes the program in the computer, the disclosure is implemented. As the processor, for example, a CPU (Central Processing Unit) is able to be used. As the recording medium, a "non-transitory tangible medium", for example, such as a tape, a disk, a card, a semiconductor memory, or a programmable logic circuit is able to be used in addition to a ROM (Read Only Memory) and the like. Moreover, a RAM (Random Access Memory), which develops the program, or the like may be further included. Further, the program may be supplied to the computer via any transmission medium (such as a communication network or a broadcast wave) which allows the program to be transmitted. Note that, an aspect of the disclosure can also be implemented in a form of a data signal in which the program is embodied through electronic transmission and which is embedded in a carrier wave.

CONCLUSION

An electronic apparatus (smartphone 1) according to an aspect 1 of the disclosure is an electronic apparatus including at least one imaging device (camera 10) and at least one control device (AI engine control device 30 and control device 40), in which the control device performs moving image acquisition processing of acquiring a first moving image captured by the imaging device, important scene determination processing of determining whether or not each of frames included in the first moving image is an important scene, based on image information included in the first moving image, and scene information generation processing of generating important scene information including a result of the determination whether or not each of the frames is the important scene.

In the electronic apparatus according to an aspect 2 of the disclosure, the control device may further perform moving image generation processing of extracting, as a frame for connection, the frame determined as the important scene, and generating a second moving image formed of a single frame for connection or a plurality of frames for connection that are connected, in the aspect 1.

In the electronic apparatus according to an aspect 3 of the disclosure, in the moving image generation processing, the control device may extract, from the frame determined as the important scene, the frame, which satisfies a predetermined condition, as the frame for connection, in the aspect 2.

In the electronic apparatus according to an aspect 4 of the disclosure, in the important scene determination processing, the control device may determine whether or not each of the frames is the important scene, based on at least one of a subject, a composition, and a color tone that are included in the image information, in any of the aspects 1 to 3.

In the electronic apparatus according to an aspect 5 of the disclosure, in the important scene determination processing, the control device may evaluate importance of each of the frames, based on at least one of the subject, the composition, and the color tone that are included in the image information, and determine the frame, a value indicating the importance of which is a predetermined threshold value or greater, as the important scene, in the aspect 4.

In the electronic apparatus according to an aspect 6 of the disclosure, the important scene information may include information about a time point at which the frame determined as the important scene exists in the first moving image, in any of the aspects 1 to 5.

In the electronic apparatus according to an aspect 7 of the disclosure, the first moving image may be captured in a case where the imaging device is in a still image capturing state, in any of the aspects 1 to 6.

A control device (AI engine control device 30 and control device 40) according to an aspect 8 of the disclosure is a control device that controls an electronic apparatus (smartphone 1) including at least one imaging device (camera 10), and includes: a moving image acquisition unit (41) capable of performing processing of acquiring a first moving image captured by the imaging device; an important scene determination unit (42) capable of performing processing of determining whether or not each of frames included in the first moving image is an important scene, based on image information included in the first moving image; and a scene information generation unit (43) capable of performing processing of generating important scene information including a result of the determination whether or not each of the frames in the first moving image is the important scene.

A control method according to an aspect 9 of the disclosure is a control method of controlling an electronic apparatus (smartphone 1) including at least one imaging device (camera 10), and includes: acquiring a first moving image captured by the imaging device; determining whether or not each of frames included in the first moving image is an important scene, based on image information included in the first moving image; and generating important scene information including a result of the determination whether or not each of the frames in the first moving image is the important scene.

The control device according to each of the aspects of the disclosure may be implemented by a computer. In this case, a control program of the control device, which causes the computer to operate as each unit (software element) included in the control device to thereby achieve the control device by the computer, and a computer-readable recording medium that records the control program are also encompassed in the scope of the disclosure.

[Additional Matter]

The disclosure is not limited to each of the embodiments described above and may be modified in various manners within the scope indicated in the claim, and an embodiment achieved by appropriately combining techniques disclosed in each of different embodiments is also encompassed in the technical scope of the disclosure. Further, by combining the techniques disclosed in each of the embodiments, a new technical feature may be formed.

The present disclosure contains subject matter related to that disclosed in Japanese Priority Patent Application JP 2019-081267 filed in the Japan Patent Office on Apr. 22, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising at least one camera and at least one processor, wherein
   the processor performs
   moving image acquisition processing of acquiring a first moving image captured by the camera,
   important scene determination processing of determining whether or not each of frames included in the first moving image is an important scene, based on image information included in the first moving image,
   scene information generation processing of generating important scene information including a result of the determination whether or not each of the frames is the important scene, and
   moving image generation processing of
   extracting, as a frame for connection, the frame determined as the important scene, and
   generating a second moving image formed of a single frame for connection or a plurality of frames for connection that are connected.

2. The electronic apparatus according to claim 1, wherein in the moving image generation processing,
   the processor
   extracts, from the frame determined as the important scene, the frame, which satisfies a predetermined condition, as the frame for connection.

3. The electronic apparatus according to claim 1, wherein in the important scene determination processing,
   the processor
   determines whether or not each of the frames is the important scene, based on at least one of a subject, a composition, and a color tone that are included in the image information.

4. The electronic apparatus according to claim 3, wherein in the important scene determination processing,
   the processor
   evaluates importance of each of the frames, based on at least one of the subject, the composition, and the color tone that are included in the image information, and
   determines the frame, a value indicating the importance of which is a predetermined threshold value or greater, as the important scene.

5. The electronic apparatus according to claim 1, wherein the important scene information includes information about a time point at which the frame determined as the important scene exists in the first moving image.

6. The electronic apparatus according to claim 1, wherein the first moving image
   is captured in a case where the camera is in a still image capturing state.

7. A processor that controls an electronic apparatus including at least one camera, the processor comprising:
   moving image acquiring circuitry capable of performing processing of acquiring a first moving image captured by the camera;
   important scene determining circuitry capable of performing processing of determining whether or not each of frames included in the first moving image is an important scene, based on image information included in the first moving image;
   scene information generating circuitry capable of performing processing of generating important scene information including a result of the determination whether or not each of the frames in the first moving image is the important scene; and
   moving image generating circuitry capable of performing processing of
   extracting, as a frame for connection, the frame determined as the important scene, and
   generating a second moving image formed of a single frame for connection or a plurality of frames for connection that are connected.

8. A control method of controlling an electronic apparatus including at least one camera, the control method comprising:
   acquiring a first moving image captured by the camera;
   determining whether or not each of frames included in the first moving image is an important scene, based on image information included in the first moving image;
   generating important scene information including a result of the determination whether or not each of the frames in the first moving image is the important scene;

extracting, as a frame for connection, the frame determined as the important scene; and generating a second moving image formed of a single frame for connection or a plurality of frames for connection that are connected.

\* \* \* \* \*